(12) United States Patent
Wanat

(10) Patent No.: US 6,267,046 B1
(45) Date of Patent: Jul. 31, 2001

(54) CONVECTION STEAMER

(75) Inventor: David J. Wanat, Meriden, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/513,951

(22) Filed: Feb. 28, 2000

(51) Int. Cl.$^7$ .............................. A23L 1/00; A47J 27/00; A47J 27/04
(52) U.S. Cl. ................................. 99/332; 99/339; 99/403; 99/413; 99/415; 99/417; 99/418; 99/476; 99/483
(58) Field of Search ...................... 99/473–476, 403–417, 99/516, 418, 339, 483, 340, 325–333; 126/369, 348, 20, 21 A; 219/400, 401

(56) References Cited

U.S. PATENT DOCUMENTS

| 252,884 | 1/1882 | Linney | 126/369.3 |
|---|---|---|---|
| 354,240 | 12/1886 | Roberts | 126/369 |
| 481,316 | 8/1892 | Thurston | 126/369 |
| 534,634 | 2/1895 | Coventry | 126/369 |
| 560,336 | 5/1896 | Willson | 126/369.3 |
| 4,506,598 | 3/1985 | Meister | 99/330 |
| 4,506,698 | 3/1985 | Meister | 99/330 |
| 4,509,412 | 4/1985 | Whittenburg et al. | 99/331 |
| 4,655,192 | 4/1987 | Jovanovic | 126/20 |
| 5,275,094 | * 1/1994 | Naft | 99/416 |
| 5,595,109 | 1/1997 | Shelton | 99/476 |
| 5,649,476 | * 7/1997 | Montagnino et al. | 99/415 |
| 5,865,104 | * 2/1999 | Sham et al. | 99/417 |
| 5,865,108 | * 2/1999 | Montagnino et al. | 99/476 |

* cited by examiner

Primary Examiner—Timothy F. Simone
(74) Attorney, Agent, or Firm—Ohlandt, Greeley, Ruggiero, & Perle, LLP

(57) ABSTRACT

There is provided an apparatus for steaming food contained within a perforated food basket. The apparatus includes a convector that urges steam upward and having an exit that permits steam to pass therethrough and out of the apparatus, a removable lid for sealing the exit, a steam chamber defined within at least one perforated food basket for receipt of food. The at least one perforated food basket is positioned below the convector and above a heater for providing steam to the steam chamber. The apparatus also comprises a receiving portion for receiving a water reservoir, a timer, and a tilt top housing.

18 Claims, 5 Drawing Sheets

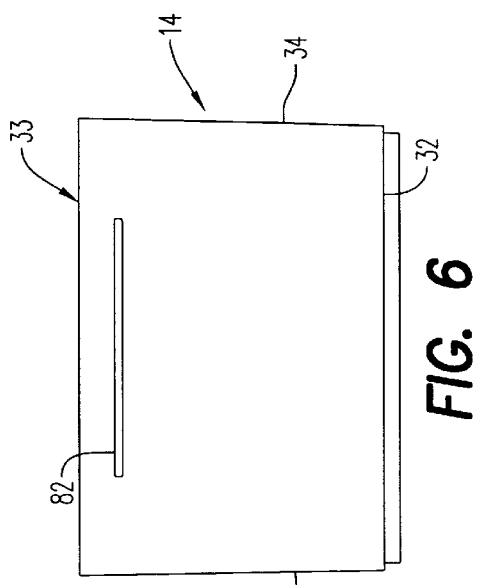
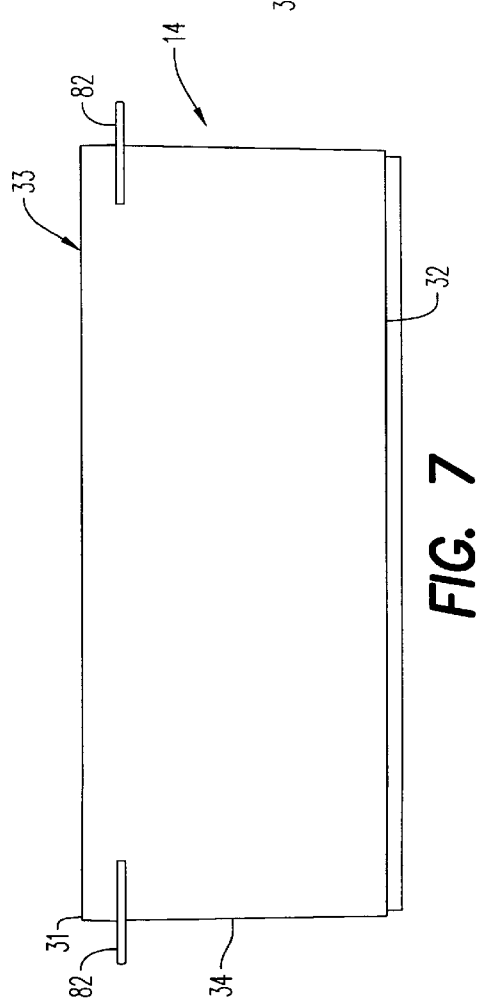
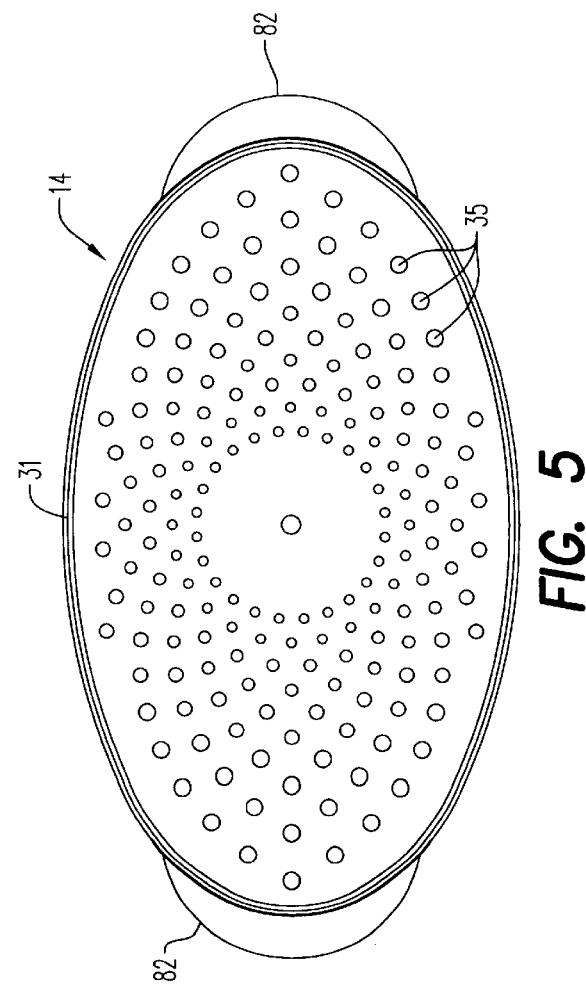

CONVECTION STEAMER

BACKGROUND OF THE INVENTION

1. Field of the Invention

The present invention relates to apparatus and methods of cooking food. More particularly, the present invention relates to a convection steamer to steam foods, such as, for example, rice and vegetables.

Devices and apparatus that are used to cook food with steam are known. These apparatus, called steamers, typically place food in a container with holes therein. The container is placed above a steam source so that the steam, which is lighter than air, passes through holes in the container and subsequently over the food. As the steam passes through the holes and over the food, it cooks the food. Any condensed water falls, via gravity, from the food and drops back through the holes in the container into a collection area or plate located usually above the steam source but below the food container. This prevents the food from being saturated in water and being boiled rather than steamed.

There are also known methods and apparatus used to cook food with convection heat or hot air. Convection ovens typically place food in the path of forced hot air allowing the hot air to pass over the food. As the hot air passes over the food, the heat is transmitted to the food, thus cooking the food.

2. Description of the Prior Art

U.S. Pat. No. 252,884 to Linney provides a multi-level steamer structure that has return feeds for the condensed water. Thus, the water may flow back into the central heating reservoir.

U.S. Pat. No. 534,634 to Coventry is directed to a multi-level steamer structure. The condensed water appears to be maintained within the individual steamer sections so as not to be allowed to flow back into the central reservoir.

U.S. Pat. No. 560,336 to Willson is directed to a multi-level steamer structure in which the steam is conducted to a multiplicity of trays through vertically arranged pipes. The condensed liquid falls into a trough that surrounds the external periphery of the steamer structure. Further arrangements showing multilevel steamer structures in which the steam is conducted to a multiplicity of trays through vertically arranged pipes are shown in U.S. Pat. Nos. 354,240 and 481,316.

U.S. Pat. No. 4,506,598 to Meister is directed to a food heater. The heater has a fat collection pan and a water outlet that is-positioned over the fat collection pan.

U.S. Patent Reexamination Certificate No. B1 4,509,412 to Whittenburg et al., is assigned on its face to Rival Manufacturing Company. It is directed to a condensate trough that surrounds a heated water reservoir.

U.S. Pat. No. 4,655,192 to Jovanovic is directed to a steam cooker that has plural heaters. The plural heaters include a secondary one that is independent of the heater associated with the boiler. The secondary heater is used to maintain the walls of the steamer at a temperature that prevents condensation of steam thereupon.

U.S. Pat. No. 5,595,109 to Shelton is directed to a food dehumidifier. The dehumidifier has two fans. One fan circulates air and the other fan blows ambient air into a water reservoir to reduce the temperature thereof.

None of these patents have the several unique features of the present convection steamer.

DESCRIPTION OF THE DRAWINGS

FIG. 5 is a top view of the primary food basket of the convection steamer of FIG. 1;

FIG. 6 is a side view of the primary food basket of FIG. 5;

FIG. 7 is a front view of the primary food basket of FIG. 5; and

SUMMARY OF THE INVENTION

It is an object of the present invention to provide a convection steamer.

It is another object of the present invention to provide such a convection steamer that has a fan over the food.

It is yet another object of the present invention to provide such a convection steamer that has a sliding or movable electronic contact for the fan.

It is still another object of the present invention to provide such a convection steamer that has a removable water reservoir.

It is still another object of the present invention to provide such a steamer that has a removable water reservoir.

It is a further object of the present invention to provide such a convection steamer that has a tilt top housing to prevent condensed liquid from entering into the boiler or boil chamber.

It is a still further object of the present invention to provide such a convection steamer that has electronic controls with a count down timer and audible signal to advise when cooking time is complete.

These and other objects of the present invention will be appreciated by an apparatus for steaming food contained within at least one perforated food basket defining a steam chamber. The apparatus comprises a convector having means for urging steam upward, the steam chamber positioned below the convector and adapted to receive means for providing steam to the steam chamber. The steam chamber is positioned below the convector and above the means for providing steam to the steam chamber. The convector has means for permitting steam to pass therethrough and out of the apparatus. The convector preferably includes an electric contact that is a slide electronic contact that permits use of more than one food basket.

The apparatus further includes a removable lid for removably sealing the steam chamber. The apparatus preferably includes a tilt top within the main housing to prevent condensate liquid from entering the means for providing steam. The apparatus further comprises a timer. The timer acts as a switch. The apparatus also comprises means for receiving a removable water reservoir.

DESCRIPTION OF THE PREFERRED EMBODIMENT

Figure 1:
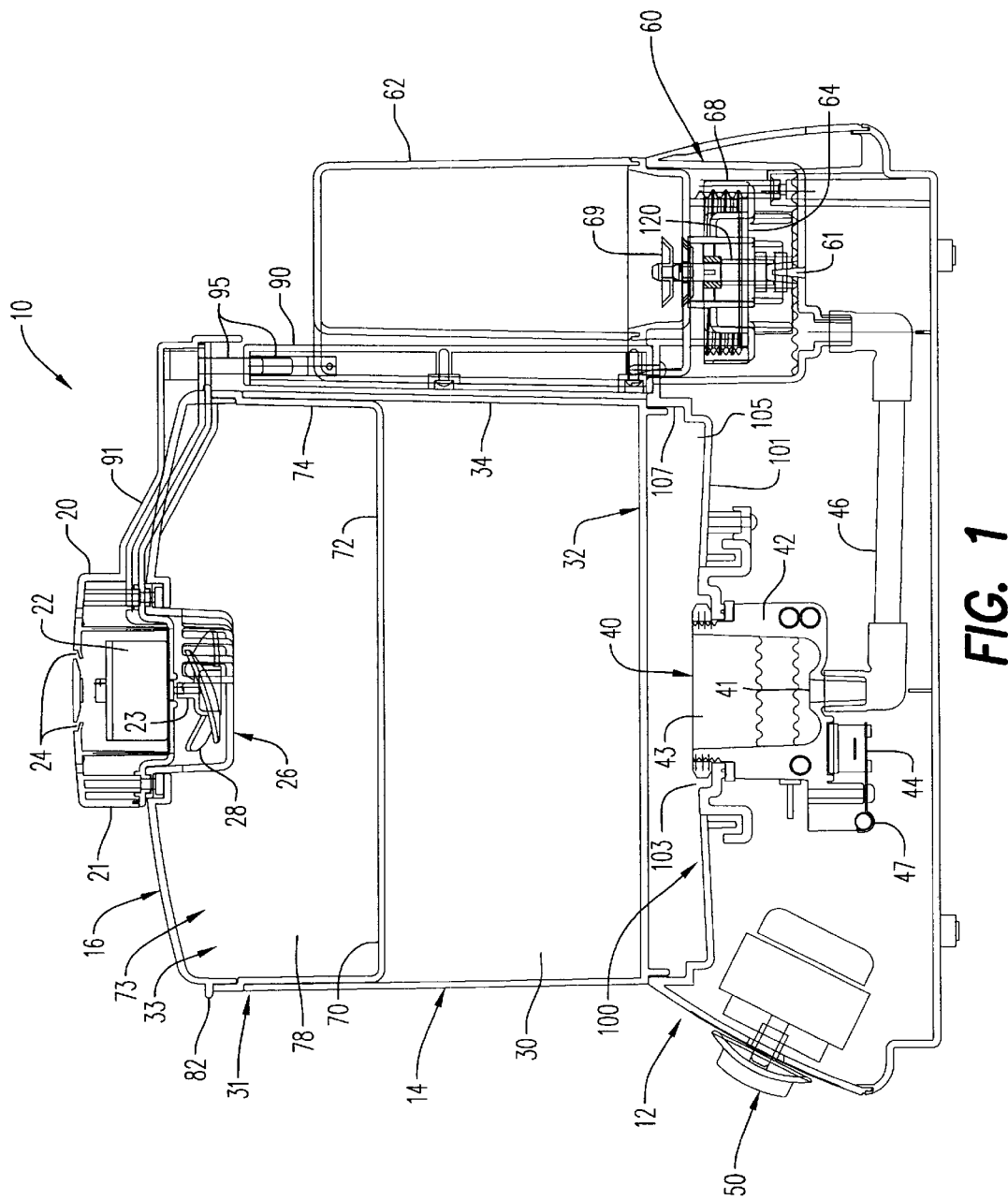
FIG. 1 is a side cross-sectional view of the convection steamer of the present invention.

Referring to the drawings and, in particular, FIG. 1, there is shown a convection steamer generally represented by reference numeral 10.

Steamer 10 has a main housing 12. Main housing 12 includes a boiling chamber 40 with an input opening 41 and an output opening 43, a timer 50 adjacent boiling chamber 40, a tank receiving portion 60 also adjacent boiling chamber 40, and an electrical connector block 90. As discussed below, a water tank 62 is adapted to be connected to tank receiving portion 60 of main housing 12 and a steam chamber 30 is adapted to be connected to main housing 12, but are not part of housing 12.

Steam chamber 30 is a primary food basket 14. As shown in FIG. 5 through FIG. 7, primary food basket 14 is preferably substantially cylindrical and has a bottom 32, sides 34, and an open top 33. Bottom 32 of food basket 14 has a plurality of perforations 35 defined therein for the passage of steam and condensate as is described below.

The primary food basket 14 is removably sealed to main housing 12 such that perforations 35 of primary food basket 14 are immediately above a tilt top 100 and output opening 43 of boiling chamber 40. Thus, steam generated within boiling chamber 40 enters steam chamber 30 of primary food basket 14 through perforations 35. Any condensate formed from the steam within steam chamber 30 will fall, via gravity, from steam chamber 30 through perforations 35 into a condensate reservoir 105 within tilt top 100.

Tilt top 100 is U shaped and substantially cylindrical. Tilt top 100 has a bottom 101, a center 103, sides 107 that along with bottom 101 define condensate reservoir 105. Output opening 43 of boil chamber 40 extends through center 103 of bottom 101 of tilt top 100 thus permitting steam to exit output opening 43 through tilt top 100. Bottom 101 is sloped away from center 103 in a degree sufficient to form condensate reservoir 105 between bottom 101 and sides 107 of tilt top 100. Condensate reservoir 105 captures condensate to prevent it from passing back through output opening 43 of boil chamber 40, thus ensuring that only clean water is used to steam the food.

Figure 2:
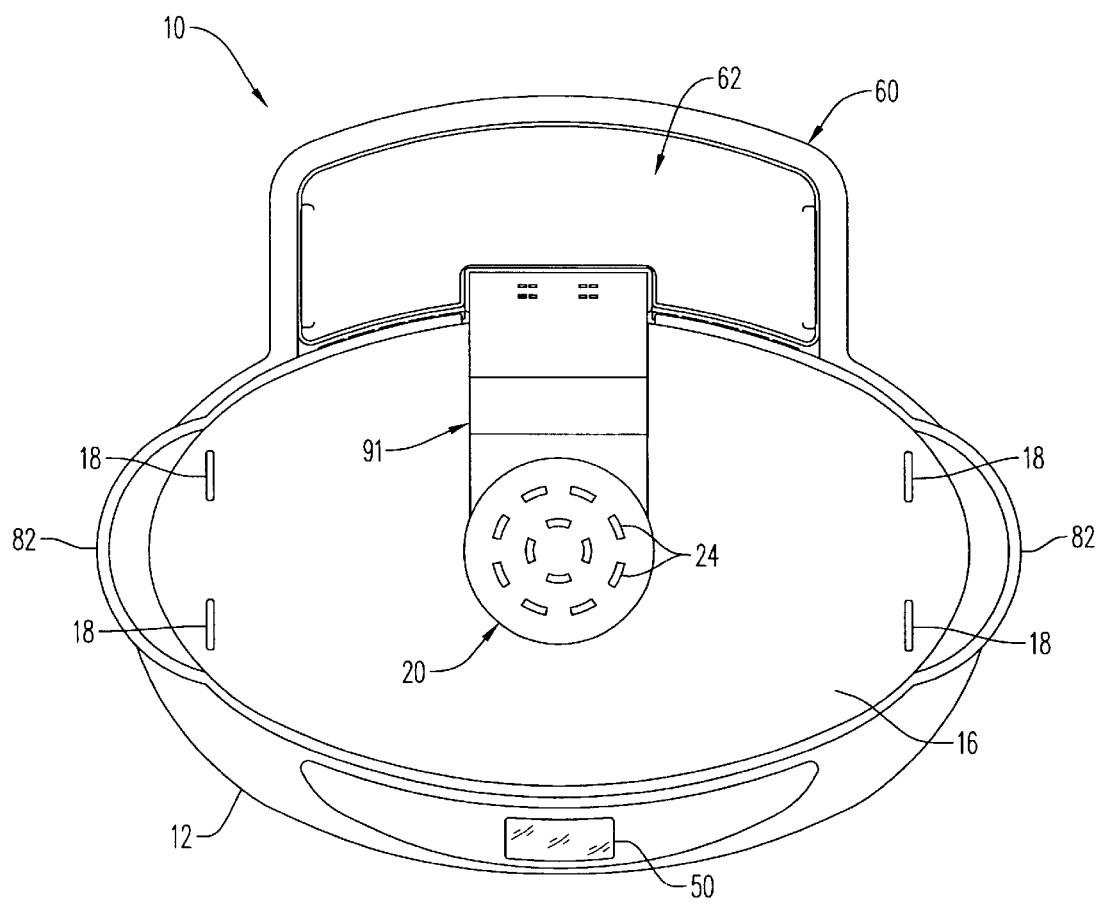
FIG. 2 is a top view of the convection steamer of FIG. 1.
Figure 8:
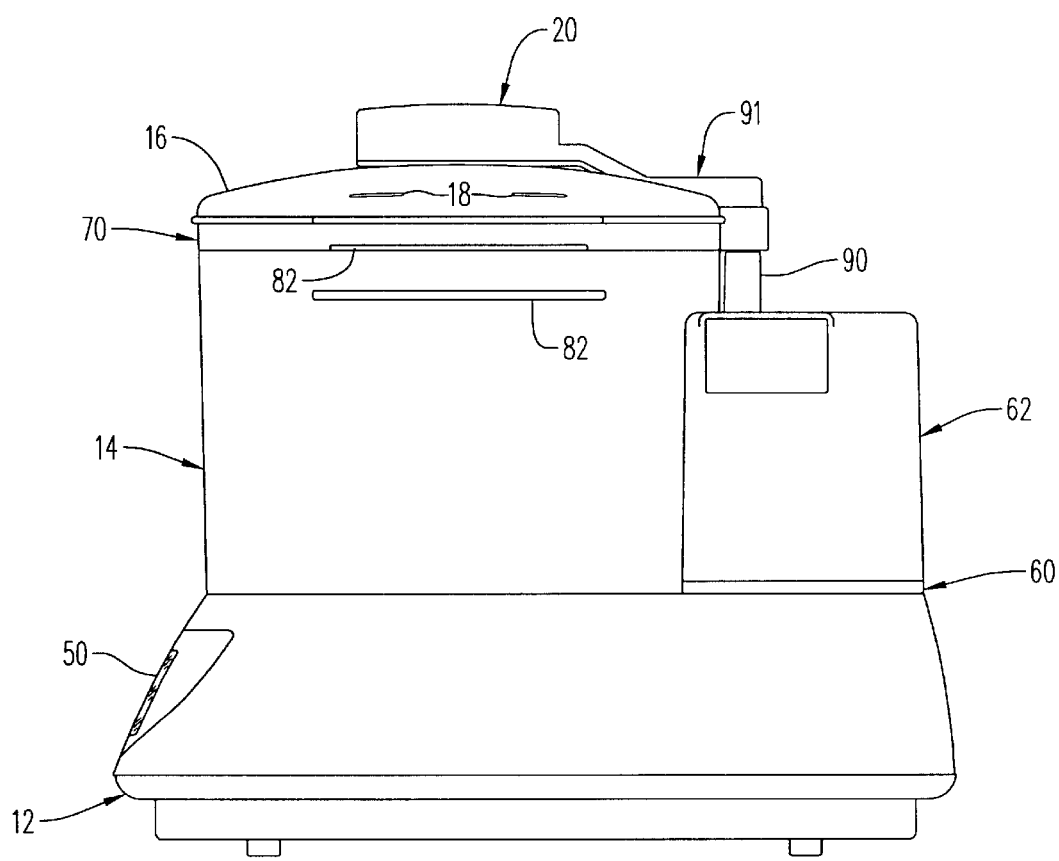
FIG. 8 is a side view of the convection steamer of the present invention.

A lid 16 is adapted to be removably sealed to open top 33 of primary food basket 14. Lid 16 covers the entire open top 33 of primary food basket 14. Lid 16 has one or more perforations 18 defined therein, as shown in FIGS. 2 and 8. Lid 16, when not removably sealed to open top 33 of food basket 14, permits access to steam chamber 30. Lid 16 provides for removable receipt of a convector 20. Convector 20 is removably sealed in lid 16, preferably in the center thereof, such that steam chamber 30 of primary food basket 14 is immediately below convector 20. In the first embodiment described above, convector 20 is removably sealed within lid 16. However, in a second embodiment, convector 20 can be eliminated so that lid 16 provides for only one or more perforations 18. Thus, steamer 10 is operable as a gravity feed steamer. Also eliminated in this second embodiment are electrical connector arm 91 of convector 20 and electrical connector block 90 of main housing 12.

In the event that multiple foods are to be steamed simultaneously, a secondary food basket 70 adapted to be removably placed on top edge 31 of primary food basket 14 may be removably sealed within steam chamber 30 of primary food basket 14. Secondary food basket 70, as shown in FIG. 3 and 4, is preferably substantially cylindrical and has a bottom 72, sides 74, and an open top 73 defining.

Secondary food basket 70 when positioned in primary food basket 14, bisects steam chamber 30 of primary food basket 14 defining therein a secondary steam chamber 78. Additionally, when removably sealed therein, secondary food basket 70 covers the entire open top 33 of primary food basket 14.

Figure 3:
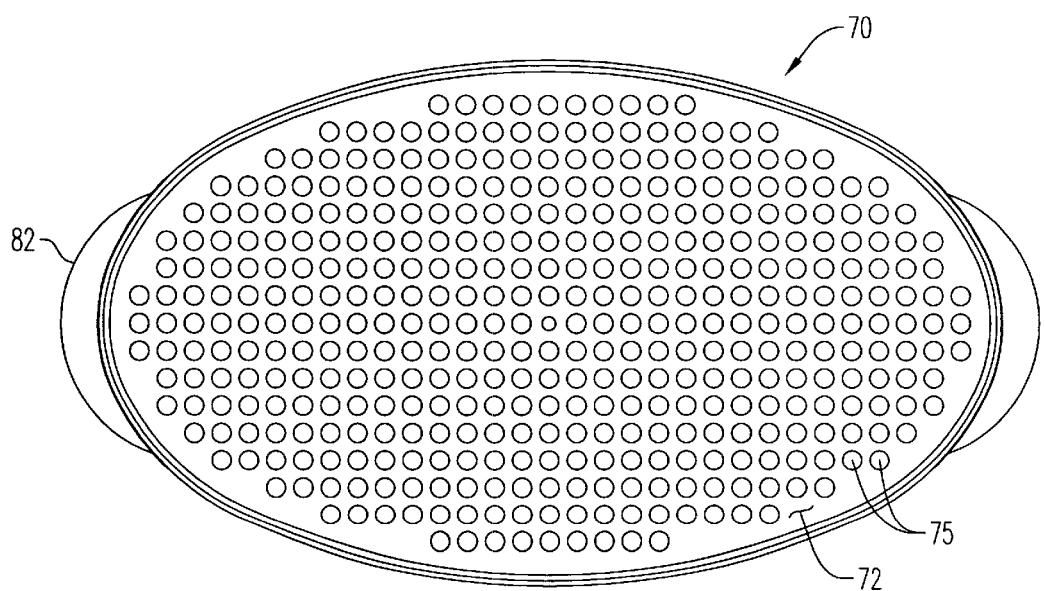
FIG. 3 is a top view of the secondary food basket of the convection steamer of FIG. 1.
Figure 4:
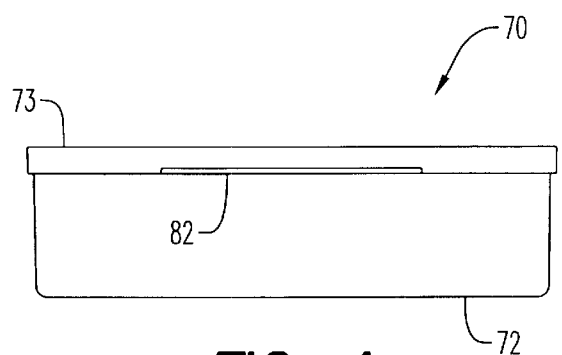
FIG. 4 is a side view of the secondary food basket of FIG. 3.

Referring to FIGS. 3 and 4, bottom 72 of secondary food basket 70 has a plurality of perforations 75 defined therein as shown in FIG. 3. Lid 16 is adapted to be removably sealed to open top 73 of secondary food basket 70 when secondary food basket 70 is disposed within primary food basket 14. Lid 16 covers the entire open top 73 of secondary food basket 70. Lid 16, when not removably sealed to open top 73, permits access to steam chamber 78. When lid 16 is removably sealed to secondary food basket 70, convector 20 of lid 16 is immediately above steam chamber 78 which is immediately above steam chamber 30.

Secondary food basket 70 is removably sealed to primary food basket 14 such that perforations 75 within secondary food basket 70 permit the steam, generated in boiling chamber 40, that has entered steam chamber 30 of primary food basket 14 through perforations 35, to flow into steam chamber 78 of secondary food basket 70. Perforations 75 also permit condensate within secondary food basket 70 to fall, via gravity, back into primary food basket 14. The condensate falls through perforations 35 into condensate reservoir 105 of tilt top 100.

As shown in FIGS. 1 and 2, convector 20 has a body or shell 21. Shell 21 is preferably annular. Within shell 21, there is a motor 22 having a shaft 23 that extends into steam chamber 30 and at least one convection output 24 that extends through cover 16 into the atmosphere outside of steamer 10. Shell 21 is adapted to mate with annular, U-shaped fan cover 26. Fan cover 26 houses an exhaust fan 28 that is operatively connected to shaft 23 of motor 22. When exhaust fan 28 is activated by timer 50, convector 20 draws steam from boil chamber 40 through perforations 35 of primary food basket 14, into steam chamber 30, through perforations 75 of secondary food chamber 70, if any, and out of lid 16 through one or more perforations 18 defined within lid 16 and through at least one convection output 24.

Convector 20 also has an electrical connector arm 91 radiating from shell 21 of the convector. Electric power is brought to motor 22 of convector 20 through a series of slide electric contacts 95 within electrical connector arm 91. Slide electric contacts 95 of electrical connector arm 91 mate with a corresponding series of slide electric contacts 95 within electrical connector block 90 of main housing 12. Slide electric contacts 95 within electrical connector arm 91 of convector 20 and electrical connector block 90 of main housing 12 enable electrical power to be brought to motor 22 when lid 16 is removably sealed directly to primary food basket 14 or when the lid is removably sealed to secondary food basket 70 disposed within primary food basket 14.

Boil chamber 40 has a heater 42, a thermostat 44 and a fuse 47. Boil chamber 40 is connected by a fluid conduit 46 to tank receiving portion 60. Heater 42 is in contact with the water in boil chamber 40 and heats the water into steam. Thermostat 44 is connected electrically, by conventional electrical wiring, through fuse 47 to heater 42, convector 20 and timer 50. Thermostat 44 acts to maintain the water in boil chamber 40 at a desired temperature, such as 100 degrees C. Thermostat 44 also acts as a temperature limiting thermostat to turn off heater 42, in the event no water is present in boil chamber 40, by detecting temperatures at a present limit above the desired temperature. Additionally, fuse 47, in the event that thermostat 44 fails to detect temperatures above the preset limit, will shut off main power to heater 42 in the event that the temperature exceeds the preset limit.

Timer 50 is preferably disposed in housing 12, and is positioned adjacent boil chamber 40. Timer 50 is preferably a minute timer that can be set in any increments of one minute and up to sixty minutes. Timer 50 is turned to a recommended amount of time based on the type and quantity of food to be steamed. Timer 50 acts as a switch to energize heater 42 of boil chamber 40 and energize convector 20. Steam is generated from the water within boil chamber 40 by heater 42. Thermostat 44 maintains the temperature of the water in boil chamber 40 at the desired temperature, preferably 100 degrees C. The steam within boil chamber 40 is drawn by convector 20 into steam chamber 30 of primary food basket 14 and into steam chamber 78 of secondary food basket 70, if any. Thus, the steam passes into convector 20 and perforations 18 within lid 16.

When timer 50 reaches zero, it will emit, by a conventional amplifier and circuitry, an audible signal that indicates that the cooking time has been completed. It will also act as a switch to de-energize heater 42 of boil chamber 40 and de-energize convector 20.

A significant advantage of the present invention is tank receiving portion 60 that is removably connected to water reservoir or tank 62. Tank receiving portion 60 is adapted to draw the water from water reservoir 62 to supply the water to input opening 41 of boil chamber 40. Tank 62 provides for receipt of enough water for one hour of steaming. The removability of tank 62 provides easy access and easy replenishing of the water. Tank 62 can be of any shape as long as it has a portion adapted to mate with tank receiving portion 60. Tank 62 is, in one embodiment shown in FIG. 2, preferably configured about electrical connector block 90 of main housing 12.

Water reservoir 62 has a refill opening 64. Refill opening 64 is adapted to receive a removably sealable cap 68. Cap 68 has a check valve 69 disposed therein. Check valve 69 has a member 120 for biasing check valve 69 in a normally closed position.

Tank receiving portion 60 has a mechanism 61 for opening check valve 69. Mechanism 61 opens check valve 69 when tank 62 has been placed into tank receiving portion 60. Preferably mechanism 61 is a solid pin that compresses biasing member 120 on check valve 69 to allow water to flow through it. Fluid conduit 46 connects tank receiving portion 60 and input opening 41 of boil chamber 40. Thus, when tank 62 is positioned in tank receiving portion 60 such that check valve 69 is open, fluid conduit 46 enables the water in tank 62 to be in fluid communication with boil chamber 40.

The bottom 63 of tank 62 is positioned at a higher elevation than output opening 43 of boil chamber 40. This positioning allows the pressure of water inside of tank 62 to feed the water into boil chamber 40 without the assistance of an additional water flow mechanism. Since no vent is provided in tank 62, a partial vacuum is formed within tank 62 as the water drains into boil chamber 40. The partial vacuum within tank 62 acts to prevent the pressure of the water in tank 62 from flooding through output opening 43 of boil chamber 40 and into steam chamber 30.

Tank 62 is filled with water through refill opening 64. Cap 68 is removably sealed to refill opening 64 and tank 62 is placed onto tank receiving portion 60 of housing 12. The food to be steamed is placed into at least primary food basket 14, which is removably sealed to housing 12. If more than primary food basket 14 is to be used, secondary food basket 70 can be removably sealed within steam chamber 30 as described above. Lid 16 is adapted to be removably sealed to either primary food basket 14 or secondary food basket 70.

The food baskets (primary 14 and secondary 70) will preferably be made of clear thermoplastic and have perforated holes at their base to support the food, but allow steam to flow through and allow condensed liquid to fall back to condensate reservoir 105 in tilt top 100. Primary food basket 14 and secondary food basket 70 preferably have handles 82.

Thus, steamer 10 uses both convection and steam to provide for a faster and more effective way to steam cook food. The present invention uses convector 20 positioned over at least one food basket to draw greater amounts of steam though the food than is normally permitted by rising steam steamers, thus providing a more rapid cooking process.

The present invention provides for tank 62 to be removable, and not part of main housing 12, thereby providing significant benefits. Also, since tank 62 is not part of main housing 12, it permits a consumer to steam longer than other steamers since tank 62 will hold enough water for steaming over sixty minutes.

The tilt top 100 urges condensate liquid from entering output opening 43 of boiler chamber 40. Thus, only clean water is used for steaming the food. Further, there is no need for a separate drip tray. Also, electric contacts 95 allow a consumer to use convector 20 with primary food basket 14, and with a combination of primary food basket 14 and secondary food basket 70.

The present invention having been thus described with particular reference to the preferred form thereof, it will be understood that various changes and modifications may be made therein without departing from the spirit and the scope of the invention as defined by the appended claims.

What is claimed is:

1. An apparatus for steaming food comprising:
    a perforated food basket for defining a steam chamber for receipt of the food;
    a convector having means for urging steam upward, said steam chamber being positioned below said urging means;
    means for providing steam to said steam chamber, said providing means being positioned below said steam chamber,
    wherein said urging means urges steam from said providing means through said steam chamber to said convector, and
    a second perforated food basket for defining a second steam chamber for receipt of the food, said second perforated food basket being positioned between said convector and said perforated food basket.

2. The apparatus of claim 1, wherein said convector has an exit that permits steam to pass therethrough and out of the apparatus.

3. The apparatus of claim 1, further comprising a removable lid for sealing said steam chamber.

4. The apparatus of claim 1, wherein said convector has a motor and a fan.

5. The apparatus of claim 1, wherein said convector is connected to an electric contact.

6. The apparatus of claim 5, wherein said electric contact is a slide electronic contact that permits use of more than one perforated food basket.

7. The apparatus of claim 1, further comprising a timer.

8. The apparatus of claim 1, wherein said timer acts as a switch.

9. The apparatus of claim 1, further comprising means for removably receiving a water reservoir.

10. The apparatus of claim 1, wherein said means for providing steam includes a boil chamber.

11. The apparatus of claim 10, wherein said boil chamber has a heater.

12. The apparatus of claim 11, wherein said boil chamber has a thermostat.

13. The apparatus of claim 1, further comprising a tilt top disposed between said providing means and said perforated food basket, wherein said tilt top collects condensate from said perforated food basket and is biased to collect said condensate away from said providing means.

14. An apparatus for steaming food comprising:
- a convector having means for urging steam upward and having an exit that permits steam to pass therethrough and out of the apparatus;
- a removable lid for sealing said exit;
- a perforated food basket for defining a steam chamber therein for receipt of the food, said steam chamber being positioned below said urging means;
- means for providing steam to said steam chamber, said steam providing means being positioned below said perforated food basket, wherein said urging means urges steam from said steam providing means through said steam chamber to said convector; and
- means for receiving a water reservoir, wherein said convector includes a slide electronic contact that permits use of more than one perforated food basket.

15. The apparatus of claim 14, further comprising a second perforated food basket with a second steam chamber defined therein for receipt of the food, said second perforated food basket being positioned between said convector and said perforated food basket.

16. The apparatus of claim 14, wherein said convector has a motor and an exhaust fan.

17. The apparatus of claim 14, wherein said means for providing steam includes a boil chamber, and wherein said boil chamber has a heater and a thermostat.

18. The apparatus of claim 14, further comprising a tilt top disposed between said providing means and said perforated food basket, wherein said tilt top collects condensate from said perforated food basket and is biased to collect said condensate away from said providing means.

* * * * *